United States Patent
Palmisiano et al.

(10) Patent No.: US 6,764,620 B1
(45) Date of Patent: Jul. 20, 2004

(54) REACTION-FORMING METHOD FOR PRODUCING NEAR NET-SHAPE REFRACTORY METAL CARBIDES

(75) Inventors: Marc N. Palmisiano, Pittsburgh, PA (US); Kevin J. Jakubenas, Austin, TX (US); Rita Baranwal, Glenshaw, PA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/994,823

(22) Filed: Nov. 28, 2001

(51) Int. Cl.[7] ............................................. C01B 31/00
(52) U.S. Cl. ..................... 264/29.7; 264/29.1; 264/625; 264/642; 264/658
(58) Field of Search ................................ 264/642, 658, 264/625, 29.7, 29.1

(56) References Cited

U.S. PATENT DOCUMENTS

| | | | |
|---|---|---|---|
| 2,938,807 A | * 5/1960 | Anderson | 264/670 |
| 3,947,550 A | * 3/1976 | Fitchmun | 264/29.7 |
| 4,940,679 A | 7/1990 | Claar et al. | 501/96 |
| 5,024,795 A | * 6/1991 | Kennedy et al. | 264/82 |
| 5,667,742 A | * 9/1997 | Dwivedi et al. | 264/658 |
| 5,865,922 A | 2/1999 | Behrendt et al. | 156/155 |
| 5,945,166 A | 8/1999 | Singh et al. | 427/376.2 |
| 6,013,226 A | 1/2000 | Steel et al. | 419/49 |
| 6,051,096 A | 4/2000 | Nagle et al. | 156/311 |

* cited by examiner

*Primary Examiner*—Christopher A. Fiorilla
(74) *Attorney, Agent, or Firm*—Julia Cook Moody; Paul A. Gottlieb

(57) ABSTRACT

A method for reaction forming refractory metal carbides. The method involves the fabrication of a glassy carbon preform by casting an organic, resin-based liquid mixture into a mold and subsequently heat treating it in two steps, which cures and pyrolizes the resin resulting in a porous carbon preform. By varying the amounts of the constituents in the organic, resin-based liquid mixture, control over the density of the carbon preform is obtained. Control of the density and microstructure of the carbon preform allows for determination of the microstructure and properties of the refractory metal carbide material produced. The glassy carbon preform is placed on a bed of refractory metal or refractory metal—silicon alloy. The pieces are heated above the melting point of the metal or alloy. The molten metal wicks inside the porous carbon preform and reacts, forming the refractory metal carbide or refractory metal carbide plus a minor secondary phase.

7 Claims, 1 Drawing Sheet

REACTION-FORMING METHOD FOR PRODUCING NEAR NET-SHAPE REFRACTORY METAL CARBIDES

STATEMENT REGARDING FEDERALLY SPONSORED RESEARCH AND DEVELOPMENT

The invention described herein was made in the performance of work under a contract awarded by the U.S. Department of Energy. The government has certain rights in the invention.

BACKGROUND OF THE INVENTION

1. Field of the Invention

The present invention relates to ceramic compositions and methods for forming ceramic compositions. More particularly, the present invention relates to a method for making near-net-shape parts of refractory metal carbides.

2. Brief Description of the Prior Art

Reinforced silicon-carbide matrix composites having high-temperature applications requiring thermal and environmental stability and good thermal shock resistance are commonly used for combustion and exhaust components in jet and rocket engines, ceramic burner inserts, heat exchanger tubes, and the like. One example of fabricating such composites consists of the near-net-shape fabrication of silicon carbide parts using molten silicon infiltration of a porous carbon or fiber preform created by polymer pyrolysis. This method is typically referred to as "reaction forming."

An example of reaction forming is disclosed in U.S. Pat. No. 5,865,922 to Behrendt et al., in which a porous solid polymer is formed by reaction forming an infiltrated preform which is then pyrolized. According to the Behrendt et al. method, the resulting microporous carbon in the composite matrix is converted into silicon carbide.

Another example of reaction forming is disclosed in U.S. Pat. No. 5,945,166 to Singh et al. This patent discloses forming a ceramic composite fabricated from a refractory fiber preform, which is infiltrated with a polymer/resin mixture; cured at a temperature from 60° C. to 90° C.; heated to 600° C. to about 700° C. in an inert environment to convert the mixture to carbon; treated on one side with a paint or slurry containing germanium powder and a fugitive binder; treated on the other side with a boron powder containing paint or slurry; and both sides infiltrated with a molten silicon-metal alloy.

U.S. Pat. No. 4,940,679 to Claar et al. discloses self-supporting bodies produced by reactive infiltration of a parent metal into boron carbide typically resulting in a composite comprising a boron-containing compound and metal. U.S. Pat. No. 6,051,096 to Nagle et al. discloses a method of carbonizing cellulose-containing plants, which may be used to form ceramic-metal or ceramic-ceramic composites.

U.S. Pat. No. 6,013,226 to Steel et al. discloses metal carbide-containing refractory materials prepared by pyrolysing blanks comprising reactive metal sources and carbon-containing precursors under fluid pressure. Refractory composites containing ceramic fillers, reinforcing materials, such as carbon fillers, excess carbon or excess metal, are also disclosed by Steel et al. The method is used in the production of a range of metal carbide monoliths and composites with refractory properties.

A particular problem with the aforementioned refractory materials is the difficulty in forming complex shapes of the end product composites.

Fabrication of carbon preforms for molten silicon infiltration have been studied and optimized. Small amounts of refractory metals, such as molybdenum and niobium, have been added to the molten silicon to reduce residual silicon after infiltration by forming refractory metal silicides. The refractory metal silicides have the advantage of much higher melting points than pure silicon. Reaction forming, however, is limited to a single material, such as silicon carbide with only minor amounts of refractory metal silicides. Many other refractory metal carbides are of interest for their high-temperature properties such as zirconium carbide, titanium carbide, hafnium carbide, vanadium carbide, molybdenum carbide, niobium carbide, tantalum carbide, chromium carbide, and tungsten carbide.

Other methods for fabricating refractory metal carbide parts include machining, arc melting, and chemical vapor deposition. Because refractory metal carbides are hard and brittle, a net shape fabrication technique has great advantage over machining. The high melting temperatures of the refractory metal carbides make other net shape approaches, such as casting, difficult or impossible.

For example, one method for synthesizing very limited, rough shapes of zirconium carbide is arc melting in which a very high electrical current is passed through a mixture of zirconium and carbon to produce resistive heating, which melts the constituents to form zirconium carbide. Chemical Vapor Deposition (CVD) is another technique for producing refractory metal carbides in which a gas mixture is brought into contact with a high-temperature substrate. Chemical reactions at the gas-substrate interface produce the refractory metal carbide and can form complex shapes. CVD, however, is usually a very slow and expensive process requiring hours to produce micrometers of material.

There remains a need for a method to inexpensively provide monolithic, near-net-shape refractory metal carbides that can easily be configured into complex shapes.

SUMMARY OF THE INVENTION

The present invention relates to a reaction-forming method for producing monolithic, near-net-shape refractory metal carbides. The present method includes first fabricating an initial glassy carbon preform by casting an organic, resin-based mixture into a mold and subsequently heat treating the mixture in two steps.

The heat treatment consists of a low-temperature step carried out at a suitable temperature to cure the resin and a high-temperature step carried out at a suitable temperature to pyrolize the cured resin mixture leaving only a porous carbon preform. The amounts of reactants in the initial mixture can be varied permitting control over the density and microstructure of the carbon preform, which subsequently influences the microstructure and properties of the final refractory metal carbide material produced.

The glassy carbon preform is placed on a bed of refractory metal or refractory metal-silicon alloy pieces and heated above the melting point of the metal or alloy. The molten metal wicks inside the porous carbon preform and reacts, forming a refractory metal carbide or a refractory metal carbide plus a refractory metal silicide, depending on the composition of the infiltrating metal.

The refractory metal carbides of the present invention can be closely engineered by varying the constituents of the organic, resin-based mixture. The mixture may be advantageously cast into a wide variety of complex shapes, which are reflected in the shape of the refractory metal carbide produced by the present method.

DETAILED DESCRIPTION OF THE INVENTION

Figure 1:
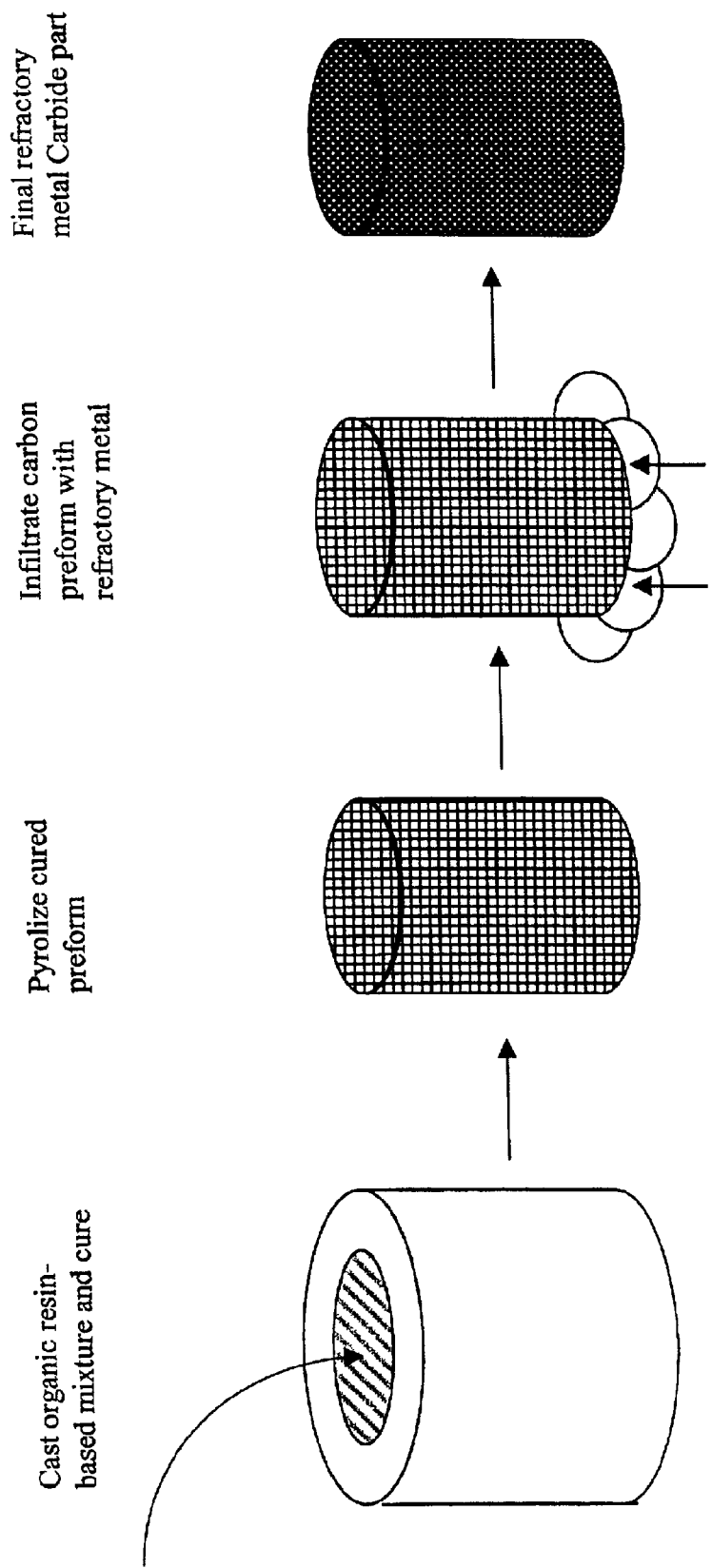
FIG. 1 is a schematic diagram showing the process of the present method.

Other than in the operating examples, or where otherwise indicated, all numbers or expressions referring to quantities of ingredients, reaction conditions, etc., used in the specification and claims are to be understood as modified in all instances by the term "about."

The present method is directed to a reaction-forming method for producing monolithic, near-net-shape, refractory metal carbides. The present method includes first fabricating an initial glassy carbon preform by casting a resin-based organic liquid mixture into a mold of desired geometry and subsequently heat treating the mixture in two steps. The amounts of reactants in the initial mixture can be varied in order to permit a level of control over the density and microstructure of the carbon preform, which subsequently influences the microstructure and properties of the final refractory metal carbide material produced.

The resin-based organic liquid mixture includes a suitable organic resin composition capable of curing to form the desired preform. Any organic resin that is able to be cured at a suitable temperature and form a solid preform can be used in the present method. In an embodiment of the present method, the resin is a furfuryl alcohol resin.

The resin-based organic liquid mixture may further include suitable solvents to aid in pore formation in the preform. Suitable materials include, but are not limited to, glycols, such as, for example, diethylene glycol and triethylene glycol.

A suitable curing catalyst may be included in the resin-based organic liquid mixture. The curing catalyst may be any material that will enhance the cure rate of the resin, especially at a lower temperature and will not adversely impact the properties of the final refractory metal carbide. A non-limiting example of a suitable curing catalyst, in the embodiment of the present invention where a furfuryl alcohol resin is used, is p-toluene sulfonic acid.

The resin-based organic liquid mixture of the present method includes a carbide. Suitable carbides include graphite, silicon carbide, zirconium carbide, titanium carbide, hafnium carbide, vanadium carbide, molybdenum carbide, niobium carbide, tantalum carbide, chromium carbide, or tungsten carbide. In an embodiment of the present invention, the carbide is in powder form.

In the present method, the heat treatment step includes two phases, a low-temperature phase and a high-temperature phase. The purpose of the low-temperature phase is to allow the resin to cure. The low-temperature phase can be accomplished at any suitable temperature at which the resin will cure. Suitable cure temperatures for the low-temperature phase are from 50° C. to 200° C., preferably from 60° C. to 175° C., more preferably from 80° C. to 150° C., and most preferably from 100° C. to 140° C. In an embodiment of the present method, the low-temperature phase is conducted at from 110° C. to 130° C. and in a particular embodiment, the low-temperature phase is conducted at 120° C. If the cure temperature is too low, the cure rate may be too slow or insufficient curing may occur. If the cure temperature is too high, the cure rate may be too fast or premature pyrolysis may take place.

The high-temperature phase is performed at a temperature suitable for pyrolyzing the mixture. By pyrolyzing, what is meant is subjecting an organic resin to very high temperatures, sufficient to effect decomposition of the resin. The high-temperature phase effectively pyrolizes the mixture leaving only a porous carbon monolith. The high-temperature phase is conducted at a temperature that will effect pyrolysis. The high-temperature phase can be conducted at from 500° C. to 1,200° C., preferably from 600° C. to 1,100° C., more preferably from 650° C. to 1,000° C. and most preferably from 700° C. to 900° C. In an embodiment of the A present method, the high-temperature phase is conducted at from 750° C. to 850° C. and in a particular embodiment, the high-temperature phase is conducted at 800° C. If the pyrolysis temperature is too low, pyrolysis will not occur. If the pyrolysis temperature is too high, elemental carbon will be lost, resulting in a poor final metal carbide composition.

After pyrolysis, the glassy carbon preform is placed on a bed of refractory metal or refractory metal-silicon alloy pieces and heated above the melting point of the metal or alloy. The molten metal then wicks inside the porous carbon preform and reacts, forming a refractory metal carbide or a refractory metal carbide plus a refractory metal silicide, depending on the composition of the infiltrating metal with the same geometry as the mold used in the initial step.

The wicking and infiltration process depends on both carbon preform porosity and infiltration temperature. Since refractory metals have very high melting points, successful infiltration may not be possible with all refractory metals in their pure state. Therefore, an embodiment of the present invention includes, in the bed of refractory metal, a refractory metal silicide. The refractory metal silicides can be those derived from zirconium, titanium, hafnium, vanadium, molybdenum, niobium, tantalum, chromium, and tungsten. The refractory metal forms a eutectic mixture with relatively small amounts of silicon that significantly lowers the melting point. The infiltration step is carried out at a temperature of 1,300° C. to 4,000° C. When only refractory metals are used, the infiltration step is carried out at 1,600° C. to 4,000° C. When appropriate suicides are used, the infiltration step is carried out at 1,300° C. to 2,500° C. In an embodiment of the present invention, zirconium is the refractory metal, and the infiltration step is carried out at a temperature of 1,870° C. to 2,500° C.

Mixtures of refractory metal compositions in the glassy carbon preform alter the bulk physical properties of the final refractory metal—silicon alloy. Specific silicon containing compositions can be used for infiltration at much lower temperatures than the pure refractory metal. Upon infiltration and reaction with the carbon preform, the refractory metal—silicon alloy will form a mixture of refractory metal carbide with small amounts of refractory metal silicide or silicon carbide. Thus, relatively low-temperature infiltration can be used to form the present near-net-shape of a refractory metal carbide with relatively small amounts of other high melting temperature phases.

A number of refractory metals suitable for use in the present method are shown in Table 1. These refractory metals form a eutectic composition with silicon. The eutectic composition melts at a significantly lower temperature than the pure metal as shown.

TABLE 1

| Metal | Metal Melting Point | Minimum Silicon in Eutectic Composition (wt. %) | Metal-Silicon Alloy Eutectic Melting Point | Melting Point Decrease in Eutectic Alloy |
|---|---|---|---|---|
| Titanium | 3,308° F. (1,670° C.) | 13.0 | 2,426° F. (1,330° C.) | 612° F. (340° C.) |
| Zirconium | 3,370° F. (1,854° C.) | 8.8 | 2,858° F. (1,570° C.) | 511° F. (284° C.) |
| Hafnium | 4,046° F. (2,230° C.) | 12.0 | 3,326° F. (1,830° C.) | 720° F. (400° C.) |
| Vanadium | 3,470° F. (1,910° C.) | 13.0 | 3,398° F. (1,870° C.) | 72° F. (40° C.) |
| Niobium | 4,478° F. (2,470° C.) | 18.7 | 3,488° F. (1,920° C.) | 990° F. (550° C.) |
| Tantalum | 5,468° F. (3,020° C.) | 17.0 | 4,100° F. (2,260° C.) | 1,368° F. (1,670° C.) |
| Chromium | 3,452° F. (1,900° C.) | 15.0 | 3,101° F. (1,705° C.) | 351° F. (195° C.) |
| Molybdenum | 4,748° F. (2,620° C.) | 26.4 | 3,668° F. (2,020° C.) | 1,080° F. (600° C.) |
| Tungsten | 6,188° F. (3,420° C.) | 31.5 | 3,920° F. (2,160° C.) | 2,268° F. (1,260° C.) |

A schematic diagram summarizing the method of the present invention is shown in FIG. 1. The first two steps of the present method involve carbon preform fabrication, and the third step involves refractory metal or metal alloy infiltration. The first step involves casting an organic, resin-based mixture into a mold and subsequently heat treating the mixture in two steps. The first heat treatment step consists of a low-temperature step which cures the resin and a high-temperature step which pyrolizes the mixture leaving only a porous carbon monolith. The amounts of reactants in the initial mixture can be varied permitting control over the density and microstructure of the carbon preform, which subsequently influences the microstructure and properties of the final refractory metal carbide material produced.

The density and microstructure of the initial carbon preform are important factors in producing high-quality, monolithic refractory metal carbides by the present method. Varying the relative amounts of resin, glycol, and graphite powder controls the density and microstructure of the preform. The resin is considered the "backbone" of the preform, providing the hydrocarbon chains that cross-link during curing and form the bulk of the structure. The acid catalyzes the cross-linking reaction. The glycol component, typically triethylene and/or diethylene glycol, are pore formers, taking up space in the structure while the resin cross-links. It is known that varying the ratio of diethylene glycol to triethylene glycol varies the ratio of large to small pores, respectively. Changing the total glycol (diethylene glycol and/or triethylene glycol, for example) to resin ratio controls the overall volume of pores, and, hence, the density of the preform. Graphite strengthens the preform and acts as a nucleation site in the preform reaction with the refractory metal. In this way, the refractory metal carbides of the present invention can be closely engineered to provide selected properties.

When the refractory metal wicks into the preform and forms refractory metal carbides, there is expansion due to the fact that refractory metal carbides have a higher specific volume than glassy carbon. For this reason, the preform needs to be designed such that there is sufficient pore volume to allow the refractory metal infiltration and subsequent refractory metal carbide expansion to occur. If there is insufficient pore volume, the reaction will occur until the refractory metal carbides being formed block the pore channels, prohibiting further infiltration. This phenomenon is termed "choking off" the reaction.

One can predict the critical preform density for choking off the reaction by considering the atomic weights and densities of the reactants and products involved. For example, when the refractory metal is zirconium the following reaction may be considered:

$$(1) C_{(s)} + (1+X) Zr_{(l)} = \rightarrow ZrC + X\ Zr$$

where each mole of C reacts to form one mole of ZrC, therefore:

$$X_{ZrC} = X_c \qquad (2)$$

Expressing (2) in terms of volume fractions of the respective reactants and products:

$$(d_{ZrC}/M_{ZrC})V_{ZrC} = (d_c/M_c)V_c \qquad (3)$$

where $d_{ZrC}$, $M_{ZrC}$, $d_c$, and $M_c$ are the densities and molecular weights of the ZrC and C, respectively. Simplifying this expression and substituting in the known values for $d_{ZrC}$, $M_{ZrC}$, $M_c$ gives:

$$V_{ZrC} = 1.311 d_c V_c = 1.311 d_c (1-V_p) \qquad (4)$$

where $V_p$ is the volume fraction of pores present in the preform. A standard preform containing 1/7 (by weight) graphite and the remainder glassy carbon has $d_c$=1.66. Substituting this value into (4) gives:

$$V_{ZrC} = 2.18(1-V_p) \qquad (5)$$

By solving this expression when $V_{ZrC}$=1 (i.e., the final product is all ZrC), $V_p$=54.0%, and, hence, the preform density is 46.0% of the theoretical density. At densities above this value, the reaction chokes off, and at values below, some metallic Zr remains in the final material as illustrated by the chemical reaction (1).

By varying the density and the pore structure of the carbon preform, one can change the nature of the reaction forming process as described above. An advantage of the present invention is that a reliable method for producing high-density carbides is achieved. Further, in the present invention, the amount of porosity (from 5% to 50%) that can be introduced into the final structure can be controlled by altering the preform mixture composition.

Another advantage of the present invention is that the reaction forming process can produce near-net-shape parts of refractory metal carbides, such that little additional machining is required. Geometry of the final part is determined by the shape of the mold used for initial casting and curing of the resin-based mixture.

The present invention also provides that the chemical composition and microstructure in the final refractory metal carbide material can be controlled, adjusted, and modified by altering the refractory metal carbide material. Also, variations in the metal alloy composition can alter the reaction temperature, microstructure, chemical composition, and physical properties of the final refractory metal carbide material.

The present invention further provides for incorporating high-temperature objects, such as fibers or other structures, into the final form produced by incorporating the fibers or other structures in the preform prior to infiltration.

The present invention provides a reliable method for producing high-density carbides. The present invention further provides for a controlled amount of porosity (from 5% to 50%) being introduced into the final structure by altering the preform mixture composition. The reaction forming process of the present invention can produce near-net-shape parts of refractory metal carbides, such that little additional machining is required.

The geometry of the final part is determined by the shape of the mold used for initial casting and curing of the resin-based mixture. In this way, the chemical composition and microstructure in the final refractory metal carbide material can be controlled, adjusted, and modified by altering the refractory metal carbide material. Further, variations in the metal alloy composition can alter the reaction temperature, microstructure, chemical composition, and physical properties of the final refractory metal carbide material.

The present invention further provides that high-temperature objects, such as fibers or other structures, can be incorporated into the final form produced, by incorporating the fibers or other structures in the organic, resin-based mixture and subsequently the preform prior to infiltration.

The present invention is more particularly described in the following Examples, which are intended to be illustrative only, since numerous modifications and variations therein will be apparent to those skilled in the art. Unless otherwise specified, all parts and percentages are by weight.

EXAMPLES 1–4

Reaction Forming Equipment and Materials

An organic liquid mixture used to produce the carbon preform included furfuryl alcohol resin, diethylene glycol (99% pure), triethylene glycol (99% pure), graphite powder (99.5% pure, 325 mesh), and p-toluene sulfonic acid monohydrate (98.5% pure); all obtained from standard chemical lots. The Zr metal was in "lump" form, produced from Zr sponge and was 99.8% pure. Curing was performed in standard laboratory drying ovens in air or under low vacuum, and pyrolysis occurred in flowing Ar in a silica tube furnace. Melting of the metal and preform infiltration was carried out in a high-temperature vacuum furnace (ultimate vacuum $1 \times 10^{-6}$ torr).

Summary of Process

In order to form the carbon preform, furfuryl alcohol resin, diethylene glycol, triethylene glycol, graphite powder, and p-toluene sulfonic acid were mixed in a beaker and cast into a mold. The resulting mixture was a thick liquid with the approximate consistency of maple syrup. The filled mold was heated to 100° C. and held at that temperature for twelve to twenty-four hours, during which time the resin cured.

The heat treatment cross-linked the resin, which resulted in 15%–20% linear shrinkage and created a dense solid that was removed from the mold. The cured piece was then heat treated to 800° C. for up to 24 hours, pyrolyzing the resin and decomposing the glycol constituents.

Little, if any, shrinkage occurred during the pyrolysis and the resulting preform consisted of a porous glassy carbon and graphite powder. With the carbon preform fully fabricated, it was then infiltrated with zirconium. The preform was placed on a bed of Zr metal chunks in a ZrC-coated graphite crucible and heated in vacuum to a temperature above the melting point of Zr (1865° C.). At this temperature, the Zr melted and wicked inside the porous carbon preform, reacting with the preform to form ZrC. This step involved no dimensional change of the piece. The only dimensional change in the process occurred during the curing and pyrolysis, which are relatively small compared to other processes in the art and very reproducible.

In this way, near-net-shape ZrC parts in a simple, controllable manner were prepared.

Table 2 shows the range of preforms produced and subsequently infiltrated in accordance with the present invention.

TABLE 2

| Example No. | Total Glycol (pbw[1]) | Diethylene Glycol (pbw[1]) | Triethylene glycol (pbw[1]) | Resin (pbw[1]) | Graphite (pbw[1]) | Density[2] (%) | Choke Off (%) |
|---|---|---|---|---|---|---|---|
| 1 | 6 | 3 | 3 | 6 | 1 | 50.9 | 46.0 |
| 2 | 7 | 3.5 | 3.5 | 6 | 1 | 45.9 | 46.0 |
| 3 | 8 | 4 | 4 | 6 | 1 | 40.9 | 46.0 |
| 4 | 9 | 4.5 | 4.5 | 6 | 1 | 37.8 | 46.0 |

[1]pbw - parts by weight
[2]overall percentage of the theoretical density of the carbon preform Zirconium infiltration of the porous carbon preform is the final step in reaction forming of ZrC. As described above, Zr (or a Zr—Si alloy) was melted and wicked into the porous carbon where it reacted to form ZrC. The dynamics of this infiltration process, as well as the properties of the final ZrC, are determined by the pore structure of the carbon preform. A preform with the composition of #3 (see Table 2) produced the highest density, highest quality ZrC.

Optical image analysis of an optical photomicrograph of the microstructure of the material produced by Example 3 reveals that it is 87% of theoretical density. The structure and chemistry of this ZrC material were confirmed by x-ray diffraction (XRD) and Auger electron spectroscopy (AES) analyses, respectively.

The XRD pattern of the material from Example 3 matched a reference XRD for cubic ZrC with a lattice parameter of 4.7 Angstroms. No other significant phases were present. From the Auger spectroscopy of the sample, the material consists of zirconium and carbon in an atomic ratio of C/Zr of 0.62 with up to 8.8 atomic percent impurity oxygen. The C/Zr ratio is within the ZrC phase which, according to the Zr-C phase diagrams, ranges from 0.61 to 1 (atomic percent). Oxygen is a common impurity in most ZrC compositions.

The preform in Example 1 had a density greater than the critical choke off density, as defined above. An optical photomicrograph of the final reaction formed ZrC material of Example 1, after infiltration, indicated more porous zirconium carbide and unreacted carbon than that observed in Example 3. The unreacted carbon (even though there was excess Zr present prior to the infiltration) and a well-defined line separating it from the ZrC illustrate the choking off phenomenon for preforms with a density above the critical value of the process.

For preforms with density somewhat lower than the critical value, such as Example 4 in Table 2, a second phase of metallic Zr is formed.

An optical photomicrograph of the material from Example 4 indicated porous ZrC and metallic Zr. The composition of the pure metallic Zr phase was also verified with AES. It is noteworthy that the ZrC in Example 4 is less dense (77% compared to 87%) than that produced from the preform in Example 3. These two examples show the control of phase chemistry, density, and microstructure made possible by the present invention. In this way, it is possible to fabricate near-net-shape zirconium carbide based materials with a wide range of material properties.

A Zr/3% Si (by weight) alloy was also infiltrated into the preform from Example 3. Although this preform was too dense to facilitate full infiltration, a combination of ZrC and $Zr_5Si_3$ phases were observed along with porosity. This demonstrates the microstructure of the final material being controlled by the chemical composition of the starting alloy.

EXAMPLE 5

A high-density zirconium carbide was prepared as follows. Four parts by weight (pbw) of diethylene glycol, 4 pbw triethylene glycol, 6 furfuryl alcohol resin, and 1 pbw graphite powder (125 mesh) were mixed in a glass container. The viscous liquid was poured into a glass mold with the shape desired of the final part (cylinder with diameter of 0.75 inches and 2 inches long).

The mixture was cured in the mold under a soft vacuum (0.1 atm) for twelve hours at 100° C. The resulting solid piece was removed from the mold. The piece was heat treated in flowing argon gas for twenty-four hours at 800° C. This step converted the cured resin/glycol mixture to pure, porous, glassy carbon, completing the fabrication of the carbon preform. The preform was found to be 40.9% theoretical density, which is below the 46.0% calculated choke off percentage.

The carbon preform was weighed, and an amount of Zr metal was calculated that ensured complete reaction with the preform. The carbon preform was placed on top of a bed of Zr metal chunks which was contained in a ZrC-coated graphite crucible. The crucible containing the carbon preform and the Zr metal was placed in a vacuum furnace (pressure less than $5 \times 10^{-5}$ torr) and heated to 1,870° C. (above the melting point of Zr metal). At this temperature, the Zr metal melted and wicked into the carbon preform and reacted to form ZrC. The density of the piece was at least 87% of theoretical.

The present invention has been described with reference to specific details of particular embodiments thereof. It is not intended that such details be regarded as limitations upon the scope of the invention, except insofar as and to the extent that they are included in the accompanying claims.

We claim:

1. A method for producing a refractory metal carbide by a reaction-forming method comprising the steps of:
   (a) casting into a mold an organic, resin-based liquid mixture comprising one or more organic-based resins, one or more glycols, a curing catalyst, one or more refractory metal carbides, and a plurality of high-temperature fibers;
   (b) heat-curing the organic, resin-based liquid mixture;
   (c) heating the cured organic, resin-based mixture to a suitable temperature, for a suitable period of time, to pyrolize the cured resin mixture to produce a pyrolized preform; and
   (d) placing the pyrolized preform on a bed of refractory metal silicide at a temperature above the melting point of the metal such that the molten metal wicks inside the porous carbon preform and reacts, forming a refractory metal carbide.

2. The method of claim 1, wherein the organic, resin-based liquid mixture comprises a furfuryl alcohol resin, diethylene glycol, triethylene glycol, p-toluene sulfonic acid, and one or more refractory metal carbides, in powder form, selected from the group consisting of graphite, silicon carbide, zirconium carbide, titanium carbide, hafnium carbide, vanadium carbide, molybdenum carbide, niobium carbide, tantalum carbide, chromium carbide, and tungsten carbide.

3. The method of claim 2, wherein the density and chemical composition of the refractory metal carbide is controlled by altering the composition of the organic, resin-based liquid mixture.

4. The method of claim 1, wherein the curing step (b) is carried out at a temperature of 50° C. to 200° C., the pyrolysis step (c) is carried out at a temperature of 500° C. to 1,200° C., and the infiltration step (d) is carried out at a temperature of 1,300° C. to 1,700° C.

5. The method of claim 1 wherein the processing temperature required for the infiltration step (d) is controlled by altering the composition of refractory metal used by the addition of silicon to the refractory metal composition and the infiltration step (d) is carried out at 1,300° C. to 1,700° C.

6. A method for producing a refractory metal carbide by a reaction-forming method comprising the steps of:
   (a) casting an organic, resin-based liquid mixture comprising one or more organic-based resins, one or more glycols, a curing catalyst, and one or more refractory metal carbides into a mold;

(b) heat-curing the organic, resin-based liquid mixture to 50° C. to 200° C;

(c) heating the cured organic, resin-based mixture to 500° C. to 1,200° C. for a suitable period of time to pyrolize the cured resin mixture to produce a pyrolized preform; and (d) placing the pyrolized preform on a bed of refractory metal at a temperature of 1,300° C. to 1,700° C., wherein the temperature is above the melting point of the metal, such that the molten metal wicks inside the porous carbon preform and reacts, forming a refractory metal carbide.

7. The method of claim 6, wherein the organic, resin-based liquid mixture comprises a furfuryl alcohol resin, the glycol comprises one or more glycols selected from the group consisting of diethylene glycol and triethylene glycol, the curing catalyst is p-toluene sulfonic, the refractory metal carbides are selected from the group consisting of graphite, silicon carbide, zirconium carbide, titanium carbide, hafnium carbide, vanadium carbide, molybdenum carbide, niobium carbide, tantalum carbide, chromium carbide, or and tungsten carbide, and the refractory metal in step (d) comprises a refractory metal silicide.

* * * * *